G. W. FAIR.
DEVICE FOR PULLING TUBES.
APPLICATION FILED OCT. 12, 1910.
1,070,124.
Patented Aug. 12, 1913.
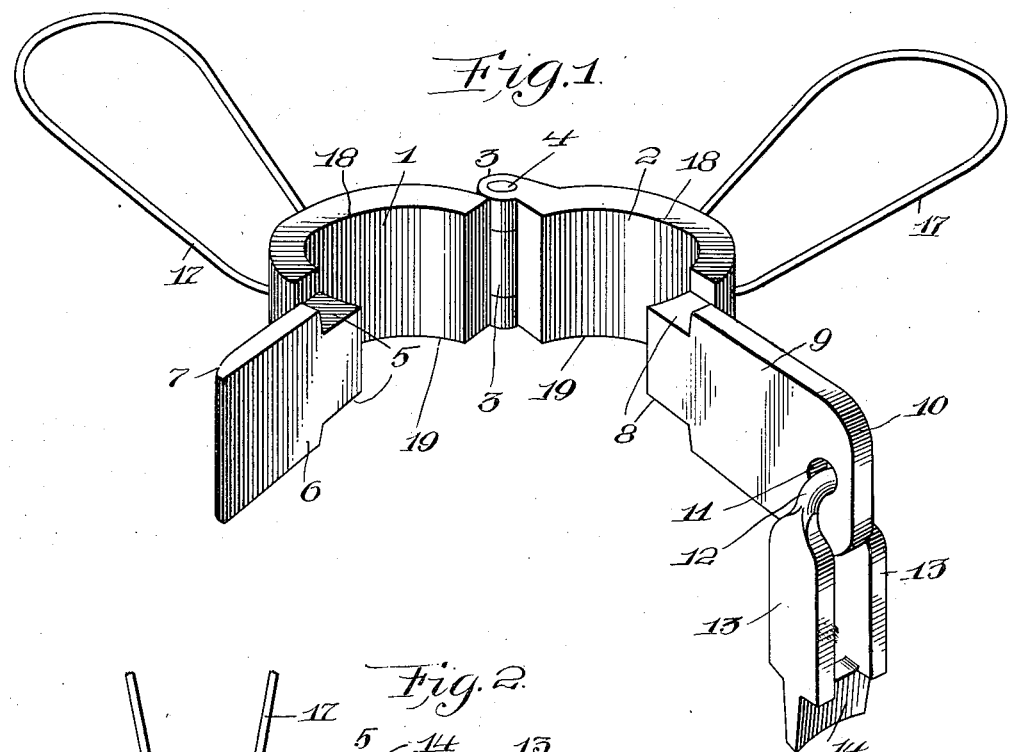
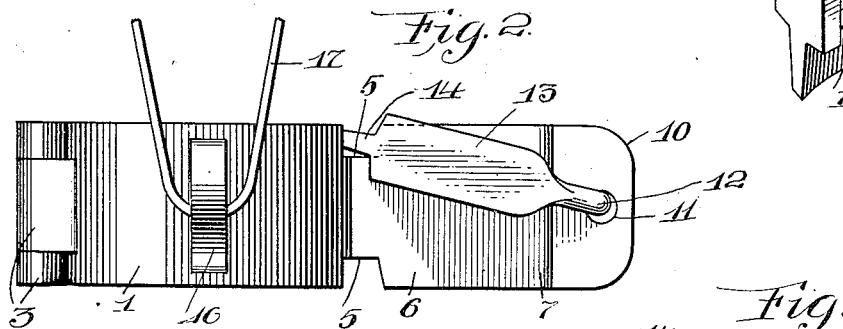
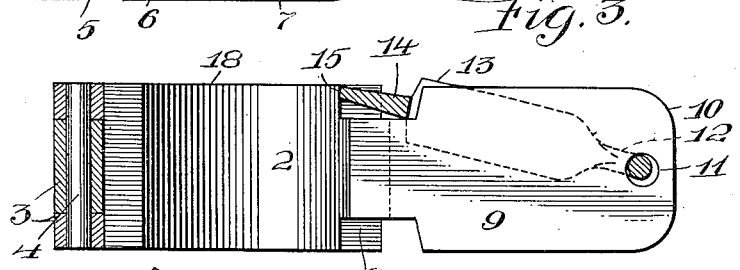
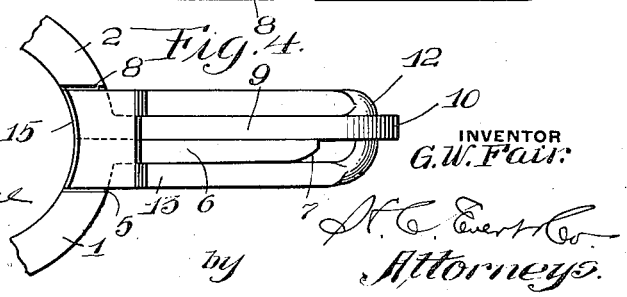
WITNESSES
INVENTOR
G. W. Fair.
by
Attorneys.

UNITED STATES PATENT OFFICE.

GEORGE W. FAIR, OF BUTLER, PENNSYLVANIA.

DEVICE FOR PULLING TUBES.

1,070,124.  Specification of Letters Patent.  Patented Aug. 12, 1913.

Application filed October 12, 1910. Serial No. 586,732.

*To all whom it may concern:*

Be it known that I, GEORGE W. FAIR, a citizen of the United States of America, residing at Butler, in the county of Butler and State of Pennsylvania, have invented certain new and useful Improvements in Devices for Pulling Tubes, of which the following is a specification, reference being had therein to the accompanying drawing.

This invention relates to a device for pulling tubes, and more particularly to a reversible clamp that can be easily and quickly placed in engagement with the tubing or casing to facilitate its removal from an oil or Artesian well.

The primary object of the invention is to provide a two-part hinged clamp with a novel locking device that permits of the clamp being inverted or reversed, thereby permitting of the clamp being inverted and further used after one end thereof has become worn.

A further object of the invention is to provide a clamp that can be easily and quickly handled and placed upon a tube, the clamp being strong, durable, and efficient for the purposes for which it is intended.

I attain the above objects by a mechanical construction that will be hereinafter specifically described and then claimed, and reference will now be had to the drawing forming a part of this specification, wherein there is illustrated a preferred embodiment of the invention, but it is to be understood that the structural elements thereof are susceptible to such changes as fall within the scope of the appended claim.

In the drawing: Figure 1 is a perspective view of the clamp in an open position. Fig. 2 is a side elevation of a portion of the same in a closed position. Fig. 3 is a longitudinal sectional view of the clamp, and Fig. 4 is a plan of a portion of the same.

Devices of this type and for the particular use for which they are employed, must be free from liability of the workman making an error in positioning the clamp on the tubing. The structure of my prior Patent, No. 221,958, granted November 25, 1879, is the device which is practically universally employed for the purposes of this invention, and the workmen, while familiar with its operation after many years experience therewith, at times have erroneously positioned the clamp on the tubing, by placing the bottom of the clamp above and at such time, when the link structure is thrown in the usual manner, the entire weight of the tubing is placed on the link, with result that it has broken, allowed the clamp members to separate and dropped the entire tubing into the well. This erroneous placing in position is due to the necessity for a rapid manipulation of the parts, and since the clamp itself is of considerable weight, the workman does not have the opportunity to reverse should he discover the error in the placing of the clamp; and in each of such cases, the link has broken and the tube dropped.

The present invention is intended to eliminate this liability of erroneously placing in position of the clamp, this elimination being provided by constructing the device so that if either end is placed upward, the link may be swung to its proper position where the weight of the tubing is placed on the jaws of the clamp itself, thereby eliminating any possibility of the pressure being placed solely on the link itself. To produce this result, I employ a specific structure of the type shown in my said prior patent, and which will now be described.

A device in accordance with this invention comprises two semi-cylindrical clamping members 1 and 2, said members having the ends thereof provided with barrels 3 pivotally connected together by a pin 4. The member 1 has the free end thereof reduced to provide shoulders 5 and extending outwardly from the reduced end of the member 1 is an arm 6 having the outer vertical edge thereof beveled, as at 7. The clamping member 2 has the free end thereof reduced to provide shoulders 8 and extending outwardly from the reduced end of said member is an arm 9, said arm having the outer end thereof rounded, as at 10, and provided with an aperture 11.

Loosely mounted in the aperture 11 is the cylindrical portion 12 of an oblong link having flat sides 13, the outer end of the link being flattened and tapered, as at 14, to engage the reduced ends of the members 1 and 2 when said members are swung together to place the arms 6 and 9 in parallelism. Besides the outer end of the oblong link being flattened and beveled, it is cut away, as at 15, to conform to the inner circumference of the clamping members 1 and 2. The clamping members 1 and 2 intermediate the ends thereof have the outer sides provided with ears or bosses 16 and loosely mounted in said ears or bosses are straps 17 adapted to be connected to a suitable hoisting mechanism for elevating the clamp. When the members 1 and 2 are swung together and the arms 6 and 9 placed in parallelism, the oblong link can be easily swung upwardly over the upper edges of said arms, whereby the flat sides 13 of the link will retain the arms 6 and 9 in engagement with each other, while the flattened end 14 of the link extends onto the reduced ends of the members 1 and 2 and completes the upper edge of the clamp.

From the above, it will be understood that the clamp can be positioned either with the upper and lower faces of the clamp shown in Fig. 1 as the upper face, and that when placed in position, the link may be properly seated so as to embrace the projections 6 and 9 and have its free end so placed as to prevent the placing of excessive weight thereon, at the same time placing the link in such manner that the collar of the tubing will prevent the link from being forced out of position.

As heretofore indicated, the devices are of considerable weight and it is required that the workman use both hands for the purpose of raising the clamp by the use of the straps 17; as both hands are engaged, the workman generally employs a foot for the purpose of swinging the link into position, thereby enabling the device to be operated by a single workman. Another advantage lies in the fact that the indiscriminate use of the upper and lower faces distributes the wear on the faces, thereby increasing the life of the clamp.

The clamp in its entirety is made of strong and durable metal and can be made, of various sizes and used for various purposes.

What I claim, is:

The combination of semicircular hinged jaws each having a radial arm and complementary alined recesses formed at the angle of each jaw and arm in the opposite edges of the latter, one of said arms being extended beyond the other, a link pivotally mounted in the longer arm at a point outside the end of the shorter arm so that it may be shifted to inclose both arms and engage the recesses in either of the edges of arms and be held by gravity in such position regardless of which end of the device is uppermost.

In testimony whereof I affix my signature in the presence of two witnesses.

GEORGE W. FAIR.

Witnesses:
CHAS. M. MITCHELL,
ALEX. MITCHELL.